United States Patent
Croh

[11] 3,751,132
[45] Aug. 7, 1973

[54] OPTICAL APPARATUS FOR SYMBOL REGONITION COMPRISING A PLURALITY OF CHANNELS

[75] Inventor: Gunther Croh, Alsterredder Germany

[73] Assignee: U. S. Philips Corporation, New York, N.Y.

[22] Filed: Jan. 28, 1971

[21] Appl. No.: 110,454

[30] Foreign Application Priority Data
Jan. 30, 1970 Germany ............... P 20 04 263.1

[52] U.S. Cl. .............................. 350/3.5, 350/162 SF
[51] Int. Cl. ........................................... G02b 27/00
[58] Field of Search ...................... 350/3.5, 162 SF, 350/167; 340/146.3 P

[56] References Cited
UNITED STATES PATENTS
3,600,054 8/1971 Gabor................................ 350/3.5
3,530,442 9/1970 Collier et al........................ 350/3.5

*Primary Examiner*—David Schonberg
*Assistant Examiner*—Ronald J. Stern
*Attorney*—Frank R. Trifari

[57] ABSTRACT

The invention relates to an optical apparatus for symbol recognition comprising a plurality of channels which include holographic filters. The Fourier spectrum of the symbol to be examined is produced in the plane of the various spatially separate filters by forming an image of a matrix of illuminated diaphragms in the filter plane, the individual diaphragms being illuminated, for example, mutually incoherently. The individual diaphragms of the matrix may be sequentially illuminated by means of an electronically controlled light deflector, for example a digital light deflector.

6 Claims, 2 Drawing Figures

3,751,132

OPTICAL APPARATUS FOR SYMBOL REGONITION COMPRISING A PLURALITY OF CHANNELS

The invention relates to an optical apparatus for symbol recognition comprising a plurality of channels which include holographic filters. The signals obtained at the outputs of the filters are a measure of the correspondence between the symbol stored in the respective filter and the examined symbol and may, at the discretion of the user, either be separately processed or be combined according to predetermined logical relations to form new signals.

Optical methods for symbol recognition are known in principle (see for example A. van der Lugt: A review of optical data-processing techniques, Optica Acta 15 (1968) pages 1-33; T.S. Huang: Image enhancement: a review, Opto-Electronics 1 (1969), pages 49-58). In most methods each filter is used to search for one symbol only. However since, for example when reading letters of different types or when identifying fingerprints, a large number of filters have to be tested, a search requires much time, especially because the filters are to be adjusted very carefully. These difficulties may be avoided by using optical multiplex systems in which a plurality of filter channels are simultaneously scanned.

For example, D. Gabor, in "Character recognition by holography," Nature, 208 (1965), pages 422-423, proposes an apparatus in which a plurality of filter functions in the form of holograms are superimposed on one another on a single photographic plate. Each separate hologram contains a specific embodiment of a symbol (character) in the form of its spatial Fourier spectrum. Since in recording these holograms coded reference sources are used, the filtering process produces light distributions in the detector plane which correspond with the said reference sources and are associated with the various characters. A disadvantage of this apparatus is that owing to the small driving range of photographic materials only a limited number of holograms can be superimposed on one another. This restriction has a particularly deleterious effect in holograms of the spatial Fourier spectra of objects that generally highly intensive deep spatial frequencies of which themselves greatly overexpose the photographic material.

Similar difficulties occur in two other kinds of optical multiplex systems. In the first kind the various channels are distinguished from one another by rotating the filters about the optical axis through different angles. See for example J.D. Armitage and A.W. Lohmann: "Theta modulation in optics" Applied Optics 4, (1965), pages 399-403. One of the assumptions on which this method is based is that the angular orientation of the symbol to be identified is known. In the optical multiple system of the second kind, the output signals are distinguished by being caused to modulate different carrier frequencies. See for example A. van der Lugt: "Practical considerations for the use of spatial carrier-frequency filters." Applied Optics, 5, (1966), pages 1760-1765. In this system it is assumed that the location of the symbol to be identified in the input plane is known.

A large part of these difficulties can be avoided in a recently proposed optical multiplex filter system. In this system the information to be identified is distributed, by means of a pupil multiplier, over a plurality of channels in each of which only one filter function is stored. The pupil multiplier is con stituted by point holograms, grating-like diffraction structures or systems comprising birefringent prisms.

The invention provides a similar system in which, however, the distribution over a plurality of filter channels is effected in a novel manner.

The apparatus according to the invention is characterized in that there is inserted in the radiation path at a point preceding the symbol to be examined a matrix of diaphragms an image of which can be formed in the plane of the holographic filters. A transparent object arranged in the radiation path at a point succeeding the diaphragm matrix is irradiated by radiation from this matrix, with the result that a Fourier spectrum of the symbols to be examined is produced in the filter plane. The individual diaphragms are preferably illuminated with mutually incoherent radiations.

The essential advantage of the invention as compared with the known apparatus consists in the possibility of a spatially discrete arrangement of the filter functions, which can only be obtained with great difficulty, whilst at the same time the various channels have a common input plane. Nevertheless the channels are mutually coherent owing to the manner in which they are controlled according to the invention. In addition, control by means of a light deflector causes the entire luminous intensity to be available in each individual channel.

Embodiments of the invention will now be described, by way of example, with reference to the accompanying diagrammatic drawings, in which.

Figure 1:
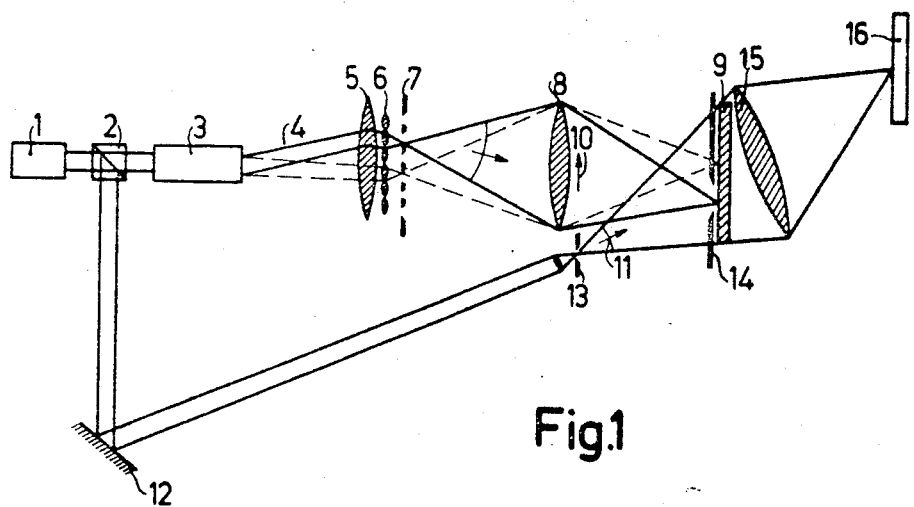
FIG. 1 shows a first embodiment of an apparatus according to the invention.

FIG. 1 shows an optical apparatus which comprises a plurality of channels, light being directed through the individual channels at different instants by means of an electronically controllable, preferably digital light deflector. A light beam emanating from a source 1 of coherent light, for example a laser source, passes through a beam splitter 2 and is directed in one of $n$ different directions by a light deflector 3. The deflected beam 4 is focussed on one of $n$ elements of a diaphragm matrix 7 by means of the combination of a field lens 5 and a fly's eye lens 6. An image of the respective diaphragms is formed in a filter plane 9 by means of the Fourier transform lens 8 proper. If a transparent object (symbol) 10 is located in the exit pupil of the lens 8, then, as is known, instead of the image of the diaphragm the Fourier spectrum of the object will be produced in the filter plane. The invention enables this spectrum to be simply and quickly produced at any location in the filter plane at which the Fourier transform lens 8 forms an image of an element of the diaphragm matrix. This only requires irradiation of the respective diaphragm of the matrix 7 by means of the light deflector 3.

However, before the filtering process proper may be started, the information about the symbols to be searched must be written in the filter plane 9. This may be effected in that there is arranged in the filter plane 9, a photographic plate on which the filter holograms of different objects 10 are successively recorded by coherently superimposing on the Fourier spectra of these objects, which are produced at different locations, a reference wave 11 common to all the spectra. The reference wave is derived in known manner from the beam emanating from the source 1 by means of the beam splitter 2, a reflecting mirror 12 and a lens diaphragm combination 13. When recording the filter matrix 9 it is of advantage to uncover only that area of the photographic plate which corresponds with the irradiated matrix element, the remainder of the photographic plate being shielded against the reference wave.

For the symbol recognition proper neither the diaphragm 14 nor the elements used to produce the reference wave, i.e., the beam splitter 2, the reflecting mirror 12 and the combination 13, are used. The Fourier spectrum of the symbol 10 to be identified is successively projected on the individual filters in the plane 9 by means of the light deflector 3. As is generally known in holography, this results in that by means of an image-forming lens 15 the cross-correlation function of the symbol 10 and of the symbol stored in the respective filter is formed at the location of the real image of the reference source. The maximum intensity of this function is detected by means of a photodetector 16. This intensity is a maximum when the examined symbol and the stored symbol are identical. Since the stored symbol is completely defined by the direction of the beam, which direction is determined by the light deflector, this intensity maximum is uniquely associated with one of the symbols stored in the filter matrix.

The use of the light deflector eliminates the necessity of any mechanical movement of the elements during the filtering process proper. Thus, in the present state of the art it is possible to perform within 1 msec. about 1,000 filtering processes, in each of which about $10^5$ image elements are handled. Another advantage is that the light distributions from the various channels cannot interfere with one another, since they are effected sequentially. In a simpler controlling method, in which light is simultaneously directed through the various channels, destructive interference would eliminate precisely the intensity maxima to be detected.

Before describing another possibility of incoherent superposition of the output signals in multichannel optical systems of the type under consideration the specific features of some elements used in the construction so far described should be pointed out.

The field lens 5 forms an image of the exit pupil of the light deflector 3 in the entrance pupil of the Fourier transform lens 8, thereby ensuring uniform illumination of the input plane 10 which is largely independent of the location of the irradiated channel. The introduction of the fly's eye lens 6 considerably reduces the requirements to be satisfied by the resolving power of the light deflector. At the same time, the efficiency of the system in respect of luminous intensity is increased.

The Fourier transform lens 8 has to satisfy the most stringent requirements. In the above-described example, in which 1,000 recorded signals are processed with television quality ($10^5$ image elements) the said lens must be capable of imaging $10^8$ image elements with satisfactory resolving power. According to the invention this requirement may be slightly mitigated by utilizing the correcting properties of a filter hologram. For this purpose, the filter holograms are recorded with the same Fourier transform lens located at the same position in which it will be used for symbol recognition. It can be theoretically shown that only the variations of the image defects due to the fact that the object (the symbol) to be identified has another place and orientation in the exit pupil of the lens 8 than had the object used in making the filter, will play a part in determining the quality of the filtering process. However, the said differential image defects may be made smaller than the absolute defects and hence their limiting effect will be smaller.

The requirements to be satisfied by the resolving power of the image — forming lens 15 are lower. In the most general case, in which the object 10 to be examined comprises a plurality of symbols which are arranged side by side and some of which are to be identified whilst their positions also are to be indicated (for example numbers on a form) the detector 16 is designed as a matrix of discrete elements, or a television camera tube is used to determine the locations of the intensity maxima. For this purpose, the resolving power of each sector of the lens 15 irradiated by a filter must at least be equal to the resolving power of the detector matrix 16.

Figure 2:
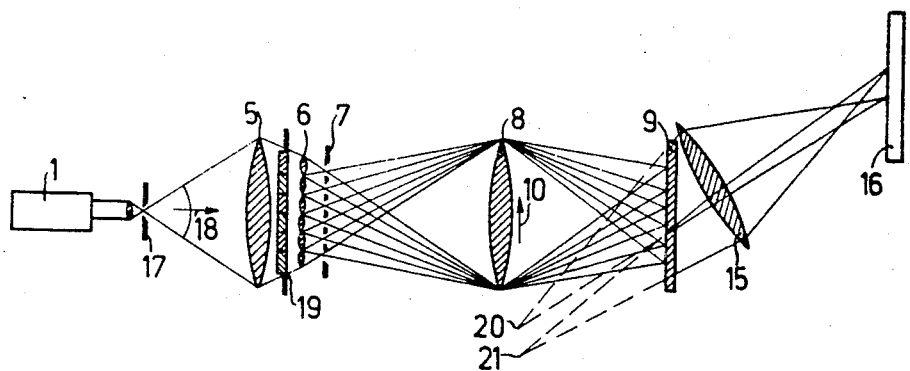
FIG. 2 shows another embodiment thereof.

A second embodiment of the invention is shown in FIG. 2, which illustrates only the filtering process proper. The main difference from the system shown in FIG. 1 consists in the manner of irradiation of the diaphragm matrix. The beam from the laser 1 is converted into a diverging spherical wave 18 by means of a lens — and — diaphragm combination 17. As in FIG. 1, the diaphragm matrix 7 is illuminated through the field lens 5 and the fly's eye lens 6. However, in this embodiment all the diaphragms are simultaneously irradiated so that light is simultaneously directed through all the filter channels. In order to effectuate the of incoherent superposition of the signals from the various channels, preferably a matrix consisting of phase modulators 19 is inserted in radiation path between the field lens 5 and the fly's eye lens 6. By suitable control the phases of the wave-fronts illuminating the individual diaphragms may so be varied in time that the interferences produced by the superposition of the wave fronts from the various diaphragms compensate one another over the detection time.

Such a matrix of phase modulators may be made up of electro-optical or magneto-optical materials. These materials have the property that when an electric or magnetic field is applied to them their refractive indices for given directions of polarisation are changed. Alternatively, within the scope of the invention the phases may be modulated by mechanical movement of a glass sheet carrying a matrix of small transparent plates having statistically varying thicknesses. The sole important feature is that the distribution geometry corresponds with the arrangement of the individual lenses in the fly's eye lens 6 and that the individual plates are homogeneous and at least of the size of the individual lenses. The remainder of the apparatus coresponds with that shown in FIG. 1. The Fourier transformation of the radiation-permeable object (symbol) 10 is performed by means of the lens 8 in the plane in which is located a matrix of the filter holograms 9. Images of the output signals of are formed on the detector matrix 16 by the lens 15. However, since in this embodiment light is simultaneously directed through all the channels, a number of output signals may be added together to establish logical relationships. For example, in the production of the filter holograms different reference sources 20 and 21 may be used and their positions may be chosen so that their images in the detector plane will spatially coincide only if the image to be processed contains certain details simultaneously and in a predetermined arrangement. Owing to the mutual incoherence the sum of the intensities is simply obtained. The resulting sum signals may be separated from the remaining signals by mean of an amplitude discriminator succeeding the detectors.

Such possibilities of establishing logical relationships are important if symbols having similar structural elements such as, for example, the letters o, p and l are to be distinguished from one another. A filter of the letter p will deliver a signal both at the o and at the l. A division of the structural details o and l of the p between two filters the output signals of which will coincide only if the o and the l are related in the manner given in the p, will improve the distinguishability of the symbols.

The invention which has been described with reference to the FIGS. 1 and 2 is not restricted to the apparatus shown in these FIGS. Several modificationd and combinations based on the same fundamental idea are possible. For example, by means of the system shown in FIG. 1 logical relationships may be established in the sense described with reference to FIG. 2 by using detector elements having integration times which are longer than the scanning time of the light deflector per channel. In each separate case advantage and disadvantages will have to be balanced, depending upon the respective use.

What is claimed is:

1. A multi-channel optical symbol recognition apparatus, comprising a planar array of holographic filters each corresponding to a recognition channel, a planar matrix of diaphragms, each diaphragm of the matrix corresponding to one of the holographic filters, the symbol to be recognized being placed between the matrix and the filters, optical means for forming an image of each diaphragm on the corresponding holographic filter, and means for projecting coherent radiation through each diaphragm that is incoherent with respect to the radiation projected through the other diaphragms of the matrix.

2. An optical apparatus as claimed in claim 1, characterized in that there is inserted in the radiation path at a point preceding the diaphragm matrix an electronically controllable light deflector capable of successively illuminating the individual diaphragms.

3. An optical apparatus as claimed in claim 2, characterized in that there are inserted in the radiation path at points succeeding the light deflector a field lens and a fly's eye lens for focussing the beam emanating from the light deflector on the diaphragm matrix.

4. An optical apparatus as claimed in claim 1, characterized in that all the spatially separate holographic filters have been recorded with the use of the same reference source.

5. An optical apparatus as claimed in claim 1, characterized in that identical filters are arranged in several of the separate transmission channels, the output signals of the filters being superimposed on one another.

6. An optical apparatus as claimed in claim 1, characterized in that in the radiation path at a point preceding the diaphragm matrix a field lens and a fly's eye lens in this order are arranged for simultaneously illuminating the individual diaphragms and that there is arranged between the field lens and the fly's eye lens a phase shifting means comprising a matrix of optical modulators, each modulator corresponding to one diaphragm for modulating the phase of the light so that in space it is constant but in time it exhibits statistic fluctuations with respect to the phases of the light emanating from the remaining diaphragms.

* * * * *

UNITED STATES PATENT OFFICE
CERTIFICATE OF CORRECTION

Patent No. 3,751,132            Dated August 7, 1973

Inventor(s) GUNTHER GROH

It is certified that error appears in the above-identified patent and that said Letters Patent are hereby corrected as shown below:

IN THE TITLE PAGE

"[54] OPTICAL APPARATUS FOR SYMBOL
REGONITION COMPRISING A PLURALITY
OF CHANNELS"

should read

--[54] OPTICAL APPARATUS FOR SYMBOL
RECOGNITION COMPRISING A PLURALITY
OF CHANNELS--;

"[75] Inventor: Gunther Croh, Alsterredder
Germany"

should read

--[75] Inventor: Gunther Groh, Alsterredder
Germany--;

IN THE SPECIFICATION

Col. 2, line 44, "diaphragms" should be --diaphragm--;

Col. 4, line 29, cancel "of"

Signed and sealed this 27th day of November 1973.

(SEAL)
Attest

EDWARD M. FLETCHER, JR.          RENE D. TEGTMEYER
Attesting Officer                 Acting Commissioner of Patents